United States Patent [19]

Iijima et al.

[11] Patent Number: 5,228,615
[45] Date of Patent: Jul. 20, 1993

[54] METHOD OF MANUFACTURING GOLF HEAD

[75] Inventors: Takashi Iijima; Toshiharu Hoshi; Mutsumi Harada, all of Hamamatsu, Japan

[73] Assignee: Yamaha Corporation, Hamamatsu, Japan

[21] Appl. No.: 657,991

[22] Filed: Feb. 20, 1991

[30] Foreign Application Priority Data

Feb. 21, 1990 [JP] Japan .................................. 2-40451

[51] Int. Cl.$^5$ ............................................. B23K 23/18
[52] U.S. Cl. .................................. 228/118; 228/157; 273/167 H
[58] Field of Search ............... 228/157, 125, 118, 181, 228/237; 273/167 H; 29/421.1, 463

[56] References Cited

U.S. PATENT DOCUMENTS

| | | | |
|---|---|---|---|
| 3,863,932 | 2/1975 | Lezatte | 273/167 F |
| 3,895,436 | 7/1975 | Summers | 228/157 |
| 4,220,276 | 9/1980 | Weisert | 228/118 |
| 4,575,447 | 3/1986 | Hariguchi | 273/167 H |
| 4,800,639 | 1/1989 | Frey | 228/157 |
| 5,028,049 | 7/1991 | McKeighen | 273/167 J |

Primary Examiner—Mark Rosenbaum
Assistant Examiner—James Miner
Attorney, Agent, or Firm—Burns, Doane, Swecker & Mathis

[57] ABSTRACT

This invention relates to a process of making golf club head, comprising the steps of preparing a sectional forming mold having a cavity which duplicates the shape of the head to be produced; preparing a coupled body, having a channel within, consisting of metal sheets made of a superplastic material; clamping the coupled body in the forming mold, heating the coupled body to a range of superplastic forming temperatures and applying fluid pressure to the sheets through the channel opening to force the sheets to conform to the shape of the head by superplastic forming; and trimming the formed product to shape to obtain the golf club head. The invented process is able to produce heads of fine uniform microstructure because the process does not involve conventional casting process, providing freedom from damaging porosities and segregation. Joining of the head portions, having outstanding mechanical properties and appearance, can be produced by a variety of means including thermal bonding, double processing and the selective use of releasing material. The process permits making of the head having thick- and thin-walled sections in one superplastic forming process.

5 Claims, 6 Drawing Sheets

METHOD OF MANUFACTURING GOLF HEAD

FIELD OF THE INVENTION

This invention relates to a new method of making golf club heads, in particular, those used in the driver, the brassie, the spoon, the baffy and cleek, the so-called metal wood type heads.

BACKGROUND OF THE INVENTION

The conventional drivers and spoons which are made of persimmon wood are becoming less popular than newer metal wood heads.

Most of such metal heads (hereinafter referred to as the heads) have been made of cast stainless steels or aluminum alloys utilizing a precision casting process known as the lost-wax casting process.

However, so long as the heads are made by a casting method, it is impossible to avoid producing defects such as porosity and segregation, and consequently, it would be difficult to produce high quality heads consistently.

Further, the cast metal heads (hereinafter referred to as cast heads) are often made of relatively large grained material of over 0.5 mm, representing relatively poor yield and tensile strengths, and coupled with the above-mentioned porosity and segregation defects, the golf heads available today are of relatively inferior mechanical qualities. Given such basic disadvantages of cast materials, it was difficult to achieve the desirable balance between the ideal size and weight of a head, and the cast heads exhibited the characteristics of small area of the sweet spot and poor directional stability of a flying ball.

Further, the cast heads required the sole portion to be attached with machine screws or brazing, requiring a number of manufacturing steps, and the balancing weight too had to be attached after the fabrication steps, thus complicating the overall manufacturing process.

The object of the present invention is to present a manufacturing method for metal golf club head having desired thin walls, increased flight distance and improved directional stability.

Still another object of the present invention is to present a metal head manufacturing method which permits: simplification of the manufacturing steps; simple attachment of balancing weight; and improved finishing of the joints.

SUMMARY OF THE INVENTION

The invented method consists of the steps of: preparing split forming molds (hereinafter referred to as the mold or the forming mold when appropriate) having a conjugate cavity to duplicate the shape of the heads to be produced; clamping at least two sheets of a superplastic material in between the forming molds, wherein at least one of the superplastic sheet material has a channel communicating with the external environment; heating said sheets to superplastic temperatures; injecting liquid through the opening of the channel and hot forming said sheets to conform to the interior shape of the cavities; and trimming the clamped regions of the molded sheets to shape the moldings.

The molded metal heads (hereinafter referred to as molded heads), made by hot forming of superplastic alloy as disclosed in the present invention, is free from casting defects, such as porosities and segregation, and provides high quality heads having uniform fine microstructures and good mechanical strengths. For superplastic forming to be possible, the pre-deformation grain size must be microcrystalline, and because the grain size of such a material remains almost unchanged even after the superplastic deformation, it becomes possible to produce thin-walled heads, having superior mechanical properties and fatigue performance, from superplastic materials without suffering loss of properties. In other word, the wall thickness of the superplastic head can be reduced without losing its strength, thereby providing a larger head having a correspondingly larger sweet spot area and higher directional stability than the heads made by conventional casting methods.

Further, because two pieces of starting sheet are heated within the same superplastic forming equipment to make the formed head, the joints between the two sheet can undergo diffusion bonding during processing, making it possible to produce seamless joints with no loss of joint strength.

Further, it is possible to vary the wall thickness locally to adjust rigidity of the impacted head; for example, by thinning the crown section of the head, it is possible to produce a head which produces a long flight distance while keeping the undesirable counter rotation (inverse rotation or back spin) low. Additionally, because the invented forming process allows in situ forming within the cavity, one forming operation is sufficient to produce an ideally balanced head having three-dimensionally complex-shapes.

Further, since the method can handle a plurality of sheets, one superplastic forming operation is sufficient to form a complete head unit. Further, by pre-bonding the plurality of sheets along the boundary of the shape of the head prior to superplastic forming, it is possible to produce joints having good mechanical properties.

This invention relates to a method of making the head according to the method above, and additionally, prior to superplastic forming operation, pre-bonding of the sheets is performed following near the cavity profile in such a way to arrange the channel to reach the interior of the cavity, and then subjecting the bonded sheets to superplastic forming. By following such a procedure, it is possible to produce a head unit without loss in joint strength.

In order to achieve the above mentioned objectives, the present invention relates to the method mentioned at the outset, further involving superplastic forming of sheets wherein a precursor mold having smaller overall dimensions is used to produce a preformed head, followed by the final superplastic forming in the forming mold to correspond with the required overall head dimension. By preforming in a mold of smaller dimensions, the final stretch forming produces a high quality head which contains no folds or steps at the joints.

In order to achieve the above mentioned objectives, the present invention relates to the method mentioned at the outset, further involving simultaneous forming of balancing weights placed inside the cavity. By following such a procedure, it is possible to integrate the balancing head within the head in one processing step, thus improving the production efficiency.

By placing the balancing weights inside the cavity prior to superplastic forming, it is possible to bond the balancing weights to the head because the weights are pressed as well as heated to enhance their diffusion bonding with the head material, thus allowing simplification of the production process.

To achieve the above-mentioned objectives, the sheet bodies are placed inside the mold with an intervening mold release material layer (hereinafter referred to as the release layer) before undergoing superplastic forming. By heating this combination arrangement, the sheet bodies were effectively pressed and heated from both sides to promote diffusion bonding to each other, and after this stage of inter-diffusion has been completed, the sheet bodies are subjected to superplastic forming operation. By following such a procedure, it was possible to eliminate the formation of steps and folds at the junction of separate head portions. This is because superplastic forming of the coated sheets begins from the interface of the release layer, thus clearly delineating the area of the head which should be deformed. Accordingly, it becomes possible to mold golf club heads which do not have any steps or folds on the inside surfaces of the junctions of various portions, and as a result have an outstanding balancing quality.

DETAILED DESCRIPTION OF THE PREFERRED EMBODIMENTS

Figure 1:
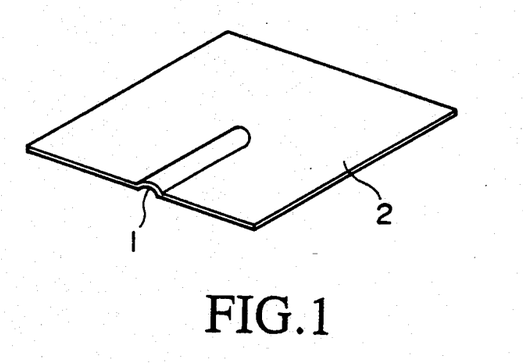
FIG. 1 is an oblique view of a molding sheet body in a preferred embodiment of this invention.
Figure 2:
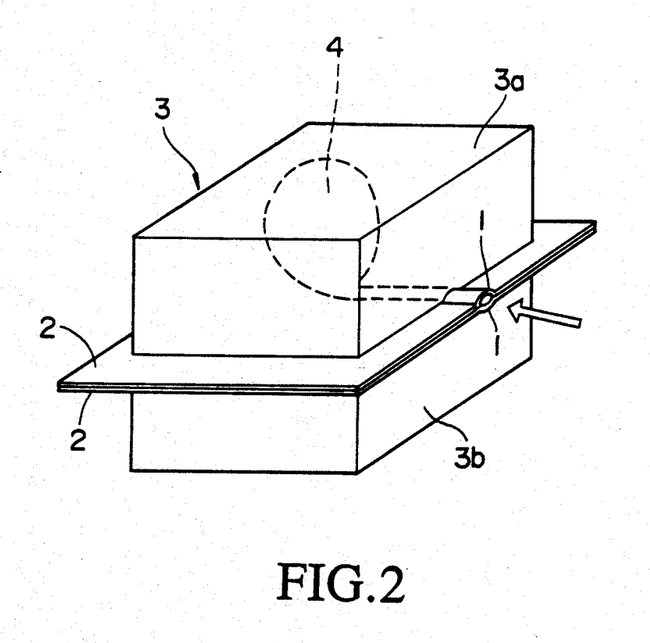
FIG. 2 is an oblique view of a set of molds for performing superplastic molding in this invention.
Figure 3:
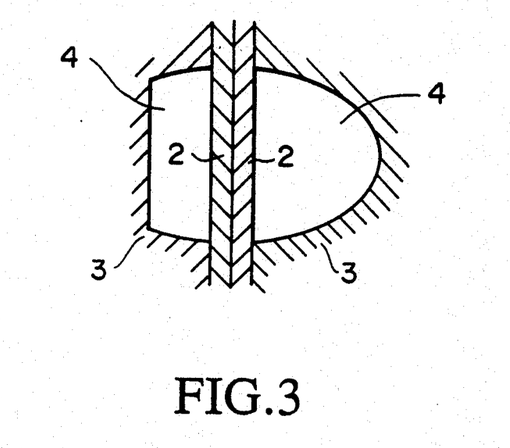
FIG. 3 is a drawing to describe the steps of molding in relation to a cavity and a sheet body.

FIGS. 1 to 3 relate to a first preferred embodiment, and the method involves preparation of two sheet bodies 2 having a channel groove 1 as shown in FIG. 1.

The channel groove 1 extends from the edge of the sheet body 2 towards the center of the sheet body 2, and is produced, for example, by means of press forming. In the case of thick sheet bodies, it is permissible to use a sheet body whose channel groove does not protrude out on the reverse side.

The superplastic material used in this invention is a material known to exhibit elongations reaching several hundreds of percent without breaking. There are a number of materials known to exhibit such superplasticity, but the preferred materials for the present invention are stainless steels, aluminium alloys, magnesium alloys, titanium alloys, Ti-Al alloys and Zn-Al alloys. The forming temperatures are in the ranges shown in the following Table 1.

TABLE 1

| Alloys | Stainless Steels | Al alloys | Mg alloys |
|---|---|---|---|
| Def. T °C. | 800–1,100 | 300–600 | 250–500 |
| Alloys | Ti Alloys | Ti-Al Alloys | Zn-Al alloys |
| Def. T °C. | 600–1,100 | 900–1,100 | 200–400 |

In the meantime, a duplicate model of the same exterior shape and size as the required head is made using a plastic resin material (for example epoxy resin), and from this duplicate model, a ceramic mold containing a conjugate cavity of the head is manufactured.

To make such a mold, ceramic powder materials, such as CaO, $ZrO_2$ and $TiO_2$, are mixed with a binder, for example methyl alcohol to make a suitable liquidy paste which is poured around the duplicate resin model to make a preform of the forming mold.

Further, two graphite heating rods are embedded into the top and the bottom portions of the above preform mold, which is split into two halves along the parting plane, which passes through the center line of the hosel portion of the resin model, and divide the head at a position which is preferably 0 to 30 mm away from the face portion of the head.

After removing the resin model from the preform mold, it is sintered at 1200° C. to make the final ceramic forming mold 3, as shown in FIG. 2, for superplastic molding operations. The ceramic mold 3 (hereinafter referred to as the forming mold 3), consists of an upper section 3a and a lower section 3b, and therebetween defines a cavity 4 to duplicate the head.

Next, as shown in FIG. 2, the grooved sheet bodies 2 are coupled to form a sheet unit having a channel 1 with its opening communicating with the outside, and the sheet body unit is clamped in between the upper and the lower sections of the forming mold 3 so as to align the opposite (to the opening) end of the channel 1 approximately with the center of the cavity 4.

Next, the graphite rods (not shown) inside the forming mold 3 are heated by passing electric current through them so as to enable the sheet bodies 2, clamped firmly by the mold sections by suitable means such as clamping tools, to attain the molding temperatures shown Table 1. For example, in the case of stainless steels, the sheet bodies 2 are heated to temperature of 950° C.

Next, a fluid substance such as argon gas, for example, is blown into the mold cavity 4 through the channel 1 opening, at a pressure of 30 kg/cm², and this pressure is maintained for a period ranging from 10 minutes to several hours.

Accordingly, the fluid injected from the channel 1 opening forces the sheet bodies 2 to superplastically deform and conform to the shape of the interior of the cavity 4.

Figure 4:
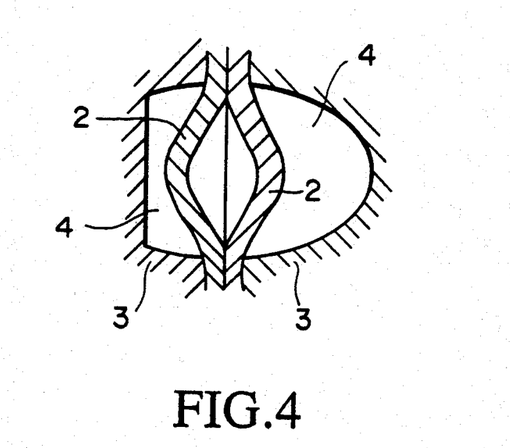
FIG. 4 shows an initial stage of the superplastic forming operation.

The process of superplastic forming is explained with reference to FIGS. 3 to 6. At the outset, the coupled sheet bodies 2 assume the position within the forming mold 3 as depicted in FIG. 3. At this time, a fluid is injected into the cavity 4 through the channel 1 opening, the coupled sheet bodies 2 begin separating at the interface and deforming towards the interior wall of the cavity 4 as shown in FIG. 4.

Figure 5:
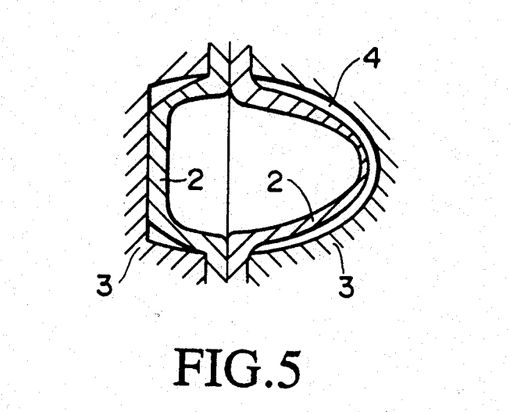
FIG. 5 shows an intermediate stage of the superplastic forming operation.

The parting line of the mold, in this case, is located close to the face portion of the head, therefore, the sheet body 2 reaches the face surface (which is shown on the left in FIGS. 3, 4 and 5) before the opposite sheet body 2 reaches the wall section of the crown portion, located in the opposite interior surface (shown in the right in the same figures). Therefore, as the forming process proceeds, as shown in FIG. 5, the wall thickness of the sheet body 2 in the crown portion becomes thinner than that in the face portion. By this means, it becomes possible to produce thicker wall in the face portion than in the crown portion.

Figure 6:
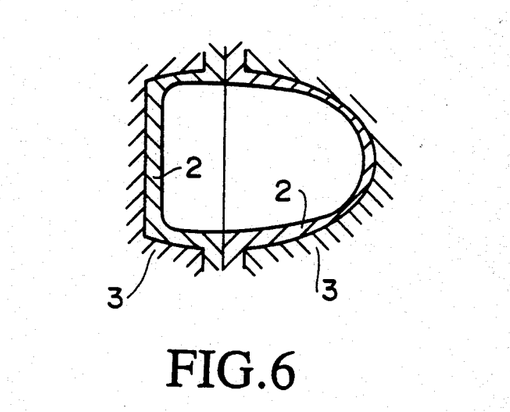
FIG. 6 shows the completed stage of the superplastic forming operation.

The temperature and pressure are maintained at the required values for the material being processed until after the forming process has reached the stage as shown in FIG. 6, which shows the sheet bodies extending and filling the cavities completely. The joint portions of the sheet bodies 2 become diffusion bonded during this processing period and form a bonded unit. Because of this in situ diffusion bonding, it becomes possible to join the two separate sections easily into a good looking unit body without the loss of joint strength.

The deformation rate (rate of strain) is preferably between $10^{-4}$ to 10/s in the above case. If the deformation rate is made faster, there is a danger of breaking the forming mold 3 due to high pressure while if it is made slower, there is a danger of losing the superplastic nature of the material caused by excessive holding time and the resulting grain growth in the microstructure of the material.

Figure 7:
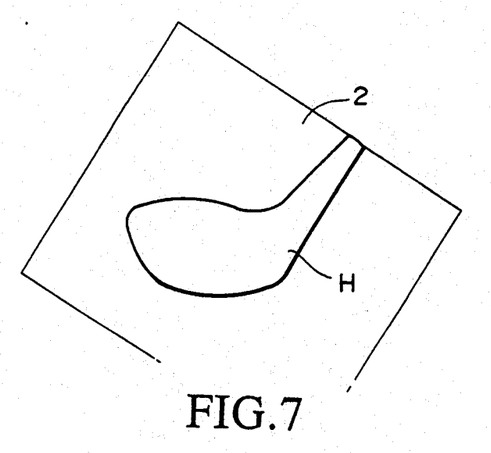
FIG. 7 shows the sheet body after the superplastic forming operation.

Next, the forming mold 3 is separated into two sections and the unitized sheet bodies 2 is taken out which contains the molded unitized head H in its central region as shown in FIG. 7.

Figure 8:
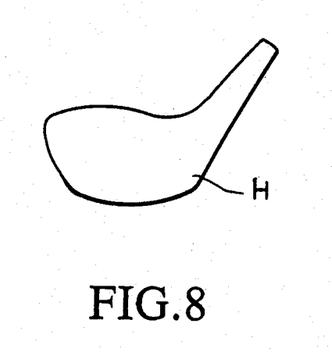
FIG. 8 shows a cross sectional view of a manufactured golf club head.

Next, the edge material of the sheet bodies is trimmed to produce a molded golf club head H as shown in FIG. 8.

The golf club head H produced by the method of superplastic forming as described above contains no casting defects such as segregation and porosities, and as a result it exhibits superior mechanical properties including toughness, and provides an additional benefit of a superior product produced with ease.

Further, because superplastic forming is possible only with fine-grained materials, naturally the starting sheet bodies 2 are fined-grained, and because the invented forming process enables the original fine grains to be nearly maintained during processing, production of superior golf club head H having superior mechanical properties including fatigue resistance is made possible. Such characteristics enable thinning of the wall thickness of the head H while permitting its volume to be increased, without increasing its weight, thereby achieving a strategic increase in the area of the sweet spot.

Further, it is possible to adjust, by altering the position of the parting line, the relative relationship between the size of the cavity and the sheet body thickness, to result in different adjustable thicknesses of the two portions of the head H.

Further, as explained above, the wall thickness of the left or right portion of the cavity 4 can be varied freely, and by reducing the wall thickness of the crown portion, it becomes possible to present a head H capable of producing a long flight distance.

Figure 9:
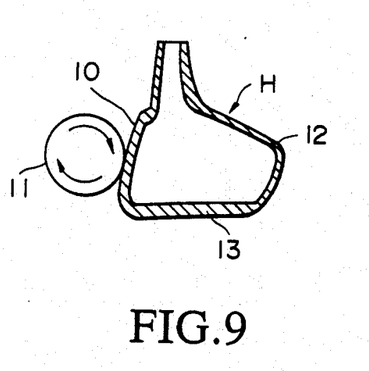
FIG. 9 is a drawing to explain the relationship between the head and the ball at the moment of impact.

The reason for the flight distance increase is explained below. As shown in FIG. 9, when a ball 11 is hit with the face portion 10 of the head H, if the crown portion 12 is thin walled, then the crown portion 12 deforms more than the sole portion 13. In this case, since there is a loft angle to a club, the ball 12 generally tends to roll up the face surface, upon impact, generating a counter rotation (clock-wise rotation in FIG. 9) which oppose the flight distance. When the crown portion 12 deforms more than the sole portion 13, the loft angle increases and the result is a generation of forces to promote (the gear effect) the positive rotation (counter clock-wise rotation in FIG. 9) from the moment of impact. The result is a suppression of the counter rotation, which results in suppression of the unproductive lift of the ball 11, thereby resulting in long flight distances.

Further, the method described above enables wall thickness as thin as 0.5 mm to be produced. As a result it has become possible to provide metal heads having a volume as large as 180-250 mL, which are equivalent to carbon wood. Unlike the casting techniques, the molding technique permits three-dimensionally complex shapes to be produced, and coupled with its capacity to produce large shape changes, the design freedom for high-performance head has been significantly increased.

Preferred Embodiment No. 1

The desired head shape and size was duplicated with epoxy resin. Using this resin model and a mixture of ceramic powders, CaO, $ZrO_2$, and $TiO_2$ with alcohol as a binder, a mold preform was produced. After inserting a graphite heating rod into each upper and lower sections of the mold preform, it was cut into two sections along a plane which passes through the center line of the hosel and is located about 0-30 mm away from the face portion. After the cutting, the mold sections were sintered at 1200° C. to obtain ceramic mold sections.

A square-shaped piece of stainless steel sheet of 3 mm thickness was press formed to provide a channel groove from the mid section of the sheet edge to the center of the square.

The grooved sheets were coupled to form a channel between them and the coupled sheet unit was clamped in the mold firmly.

Utilizing the graphite heater embedded inside the mold, the mold was heated to 950° C., and argon gas was blown in from the channel opening at 35 kg/cm$^2$ and this pressure was maintained for 40 minutes.

At the application of gas pressure, the sheets began to superplastically deform, and the clamped joint section between the forming mold bonded as a results of in situ diffusion bonding. The molded sheet was removed from the mold and the excess parts were trimmed to obtain a sample head.

Preferred Embodiment No. 2

Using the same material and mold as in Preferred Embodiment No. 1, a metal wood head was produced.

Figure 10:
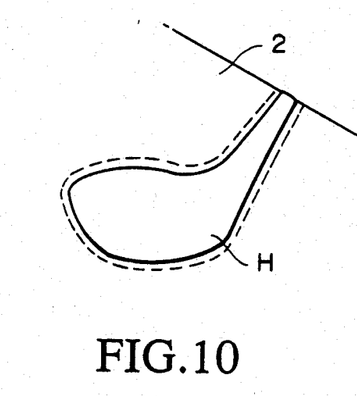
FIG. 10 relates to a second preferred embodiment.

The channel grooves were produced in stainless steel sheets of 3 mm thickness. The sheets were welded along the profile boundary of the head cavity as shown by a solid bold line in FIG. 10. In this figure, the dashed line indicates the ultimate position of the exterior periphery of the head. This head was superplastically formed in the same way as the case of Preferred Embodiment No. 1, and the formed sample was processed in the same manner to produce a sample head.

According to this method, by pre-welding the sheets before superplastic forming, improved sealing of the joint can be obtained.

Preferred Embodiment No. 3

An epoxy model slightly smaller (1–10 mm in the outer circumference and 2–20% in volume) than the desired head was produced, with which a ceramic mold was produced as in the case of Preferred Embodiment No. 1, having a cavity size which was correspondingly smaller than that of the mold used in Preferred Embodiment No. 1. Using this mold, a sample of the formed head was obtained which was slightly smaller than that obtained in Preferred Embodiment No. 1.

Next, this formed head was placed in the mold used in Preferred Embodiment No. 1, and subjected to further superplastic forming to the required finished size of the head. The excess material was trimmed to obtain a sample head of the required size.

Figure 11:
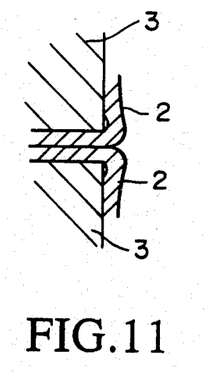
FIG. 11 relates to the first stage of the superplastic forming operation involved in a third preferred embodiment.
Figure 12:
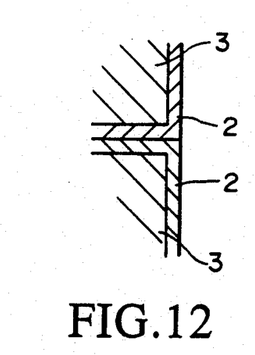
FIG. 12 relates to the second stage of the superplastic forming operation involved in the third preferred embodiment.

According to this method, even if folds are produced during the first stage of superplastic forming operation as shown in FIG. 11, they can be stretched and removed, as shown in FIG. 12, by further forming process to produce a head of good exterior appearance.

Preferred Embodiment No. 4

The sample head produced in Preferred Embodiment No. 3 was attached to a shaft to produce a gold club while a sample head prepared by conventional precision cast process was similarly made into a golf club. Various section of each club was measured, and the results are reported below in Table 2.

TABLE 2

| Thickness | Face | Crown | Volume |
|---|---|---|---|
| Super P. | 2.0 mm | 0.5 mm | 190 mL |
| P. Cast | 2.7 mm | 0.8 mm | 150 mL |

The above results demonstrated that the head produced by the invented process is thinner-walled and has a larger volume than the conventionally prepared head.

Further, the golf clubs produced as above were attached to a robotic golfer and field tested. The results are summarized in FIG. 13.

Figure 13:
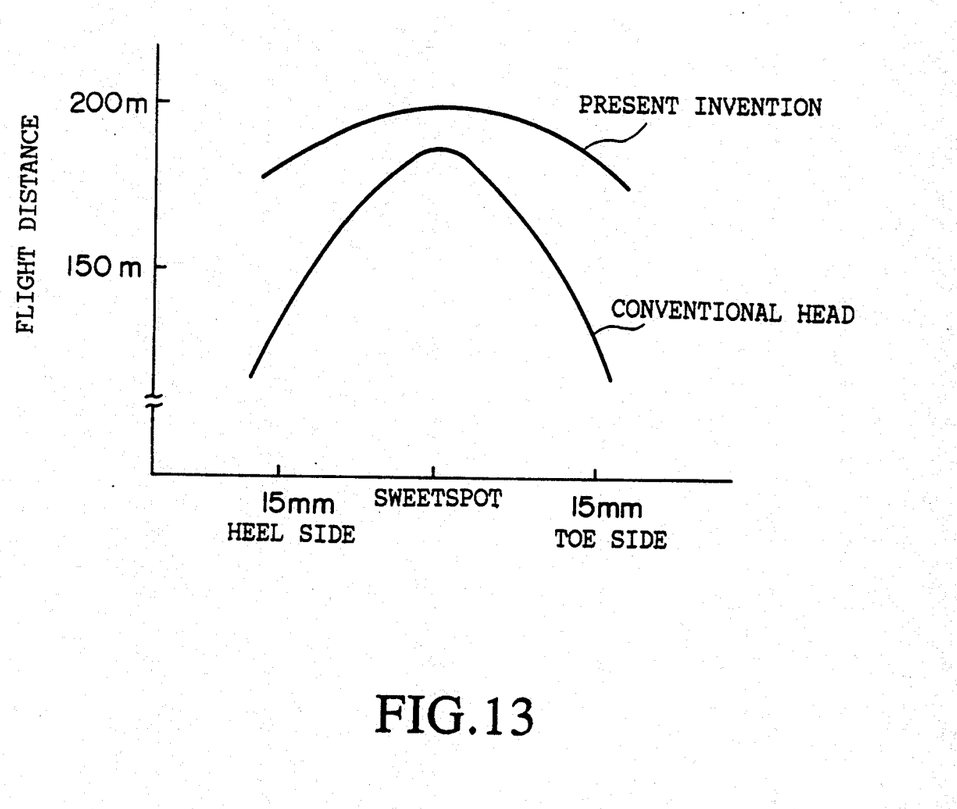
FIG. 13 is a graph to show the test results of field trials of the golf club heads produced in the preferred embodiments of the present invention.

FIG. 13 demonstrates that the golf club equipped with the head produced by the invented process has a larger sweet spot area, produces a longer flight and has improved directional stability than the club with a head produced by the conventional technique.

Preferred Embodiment No. 5

Using the procedures described in Preferred Embodiments 1 to 3, sample heads were produced from Al alloys, Mg alloys Ti alloys, Ti-Al alloys and Zn-Al alloys in the range of the forming temperatures shown in Table 1 without any difficulties.

Preferred Embodiment No. 6

Using the procedure described in Preferred Embodiment No. 1, sample heads having an integral balancing weight (or a sole thickness adjuster).

Figure 14:
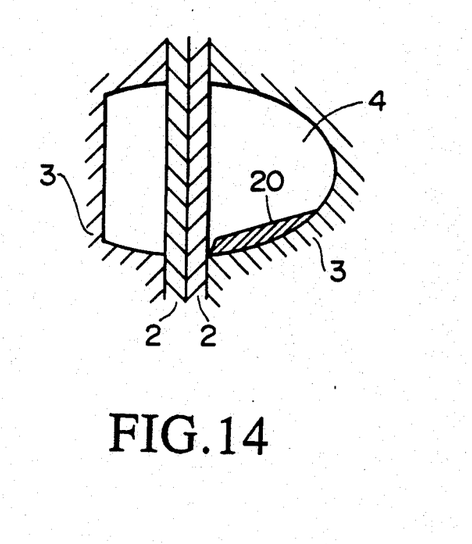
FIG. 14 is a cross sectional view showing sheet bodies and a balancing weight placed inside a mold cavity in a sixth preferred embodiment.

A piece of balancing weight 20 (or a sole adjuster) was placed, as shown in FIG. 14, in the forming mold 3 used in Preferred Embodiment No. 1. As before, argon gas was used to superplastically form the sheet body 2. The material for this adjusting piece can be any superplastic material, which may be different from the sheet body 2.

Figure 15:
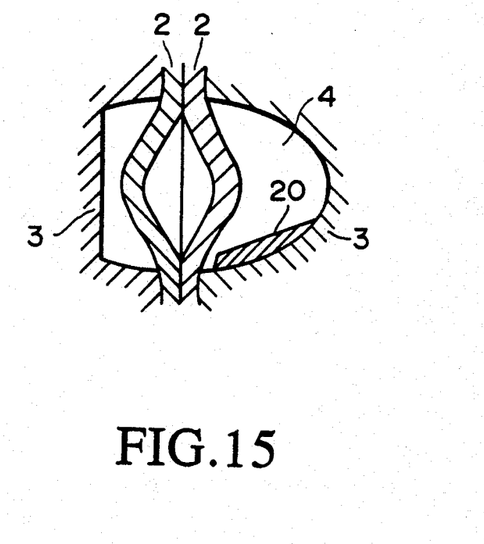
FIG. 15 shows an initial stage of the superplastic forming of the set-up shown in FIG. 14.
Figure 16:
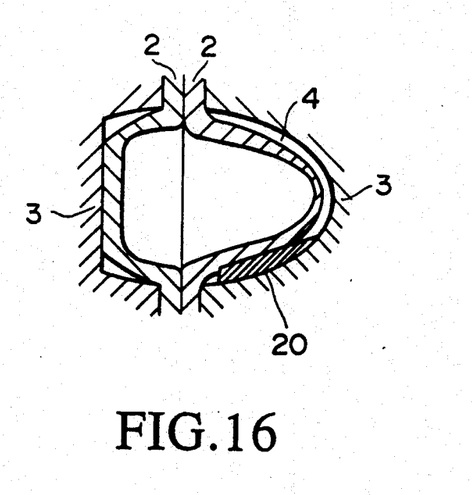
FIG. 16 shows a stage approaching the end of the superplastic forming operation shown in FIG. 15.
Figure 17:
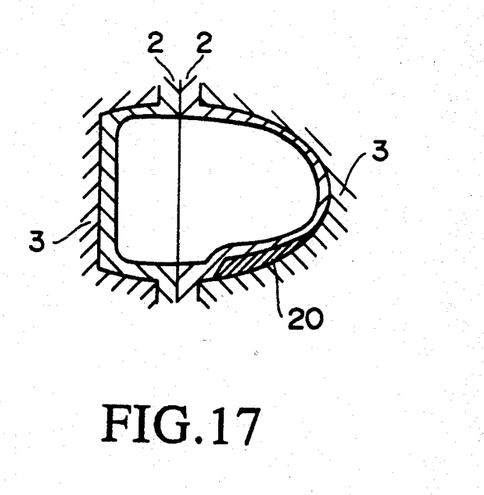
FIG. 17 shows the completed stage of the superplastic forming operation which integrates the balancing weight shown in FIG. 14.

Upon continuing the superplastic forming of the sheet body 2, as depicted in FIGS. 15, 16 and 17, the expanding portions of the sheet body 2 begin touching the piece 20, and become diffusion bonded with the piece material. The bonded interface cannot be identified visually.

After completion of the forming operation, the formed sheet body is taken out of the mold, the excess regions trimmed to make a sample head.

According to the method as described above, it is possible to incorporate the balancing piece integrally in the inside of the head.

According to such a method, it is possible to manufacture heads having an integral balancing weight in one manufacturing step to contribute to simplification of the production process. Further, if the balancing weight is replaced with the sole adjuster, it becomes possible to vary the sole thickness by using different sizes of sole adjuster.

It should also be noted that although the balancing weight was placed in this case on the right side of the cavity 4 as shown in FIG. 14, it is permissible to place it on the left side of the cavity 4 closer to the face portion.

FIGS. 18 to 23 show other cases of preferred embodiments of the present invention.

Figure 18:
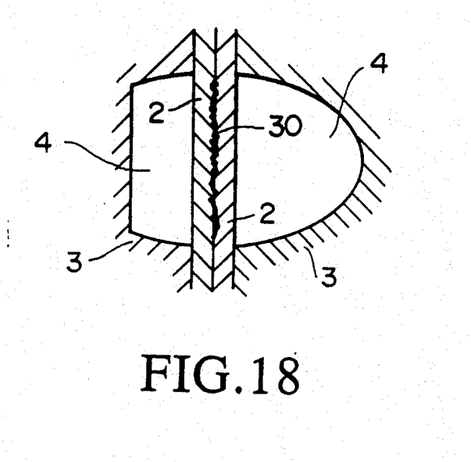
FIG. 18 is a cross sectional view of another preferred embodiment in which a release layer is placed between the sheet bodies.
Figure 19:
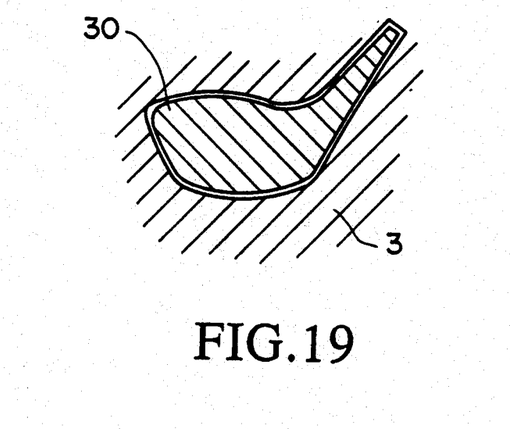
FIG. 19 is a cross sectional view of the set-up shown in FIG. 18 before the forming operation.

As shown in FIG. 18, some releasing material, such as BN (boron nitride) is placed only in the interface area located within the cavity 4 of the forming mold 3, and not in the areas clamped by the forming mold 3, to form a layer of releasing layer 30. For this purpose, a high melting point material having low diffusivity with the sheet body 2 at the superplastic forming temperature would be satisfactory. FIG. 19 shows the cross sectional view of the releasing layer 30 as seen from one side of the sectional view of FIG. 18. As shown in FIG. 19, this release layer 30 covers most of the sheet body 2 in the cavity, excepting the small region clamped by the mold 3. It is preferable that this coverage is about 80–98% of the cross sectional area of the head located within the parting plane of the mold.

Figure 20:
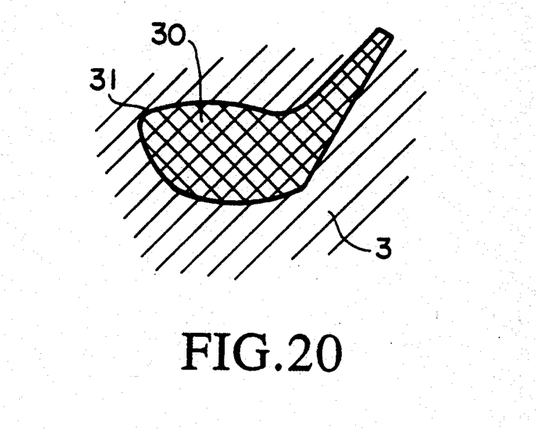
FIG. 20 is a cross sectional view of the set-up shown in FIG. 19 after the completion of the forming operation.
Figure 21:
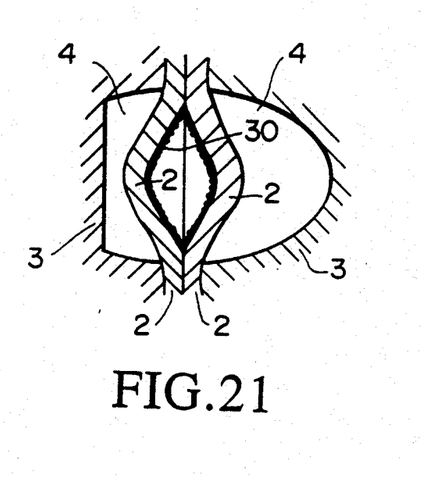
FIG. 21 is a cross sectional view of an initial stage of forming operation shown in FIG. 18.
Figure 22:
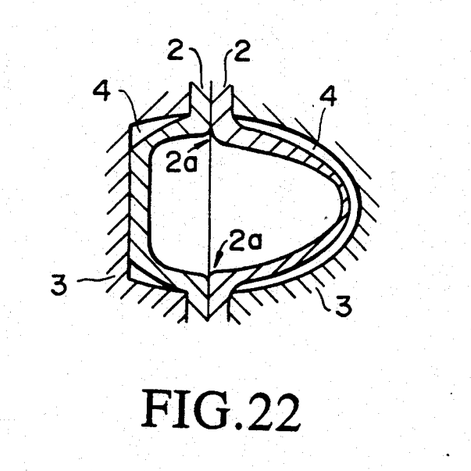
FIG. 22 is an intermediate stage of the forming operation.
Figure 23:
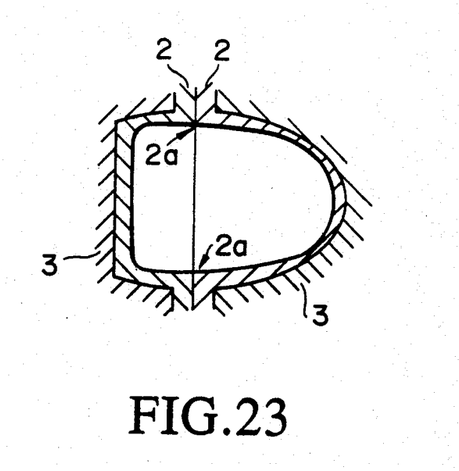
FIG. 23 is a cross sectional view of the completed stage of forming operation.

By heating of the forming mold 3 and by applying pressure simultaneously to the overall sheet body 2 held in the forming mold 3, the region of the sheet body 2, which is not coated with the releasing material, is diffusion bonded to form a joint boundary 31 shown in FIG. 20. To apply pressure to overall area of the sheet body 2, the cavity sections 4 located on both sides of the sheet body 2 can be pressurized. It is also possible to diffusion bond the boundary region by thermal pressing before setting the sheet body 2 in the forming mold 3.

Following the above operation, fluid pressure is applied through the channel of the sheet body 2 as in the previous case, to perform superplastic forming. In this case, the unbonded region of the sheet body 2 (by coating of the release material) is able to separate to produce superplastic deformation of the two sheet bodies 2, but the diffusion bonded boundary 31 can withstand the application of pressure, and will not deform. Therefore, forming of the interface area 2a, shown in FIG. 22, proceeds smoothly and continuously without the formation of steps throughout the joint boundary 31.

According to this case of preferred embodiment, it is possible to produce high quality high performance golf club head without resorting to either a welding facility as in Preferred Embodiment No. 2, or two molds as in Preferred Embodiment No. 3.

What is claimed is:

1. A process of making a gold club head comprising the steps of:
   (a) preparing a sectional forming mold having a conjugate cavity of said head defined within;
   (b) preparing a preforming mold having smaller overall cavity size than the conjugate cavity of said forming mold;
   (c) preparing a coupled sheet body from a plurality of superplastic sheet bodies, at least one of said superplastic sheet bodies having a formed channel groove extending from a central area of said at least one sheet body to an edge of said at least one sheet body to form a channel opening;
   (d) producing a preformed body with said performing mold;
   (e) placing said coupled sheet body in said sectional forming mold with said channel opening accessible to an exterior of said sectional forming mold;
   (f) heating said coupled sheet body to a superplastic forming temperature;
   (g) applying fluid pressure through said channel opening to deform said superplastic sheet bodies into a formed body; and
   (h) removing said formed body from said forming mold and trimming said formed body to conform to a shape of the head, wherein said superplastic sheet bodies are of a material selected from a group consisting of stainless steels, aluminum alloys, magnesium alloys, titanium alloys containing aluminum additions, and zinc alloys containing aluminum additions.

2. A process of making a golf club head comprising the steps of:
   (a) preparing a sectional forming mold having a conjugate cavity of said head defined within;
   (b) preparing a coupled sheet body from a plurality of superplastic sheet bodies, at least one of said superplastic sheet bodies having a formed channel groove extending from a central area of said at least one sheet body to an edge of said at least one sheet body to form a channel opening;
   (c) placing said coupled sheet body in said sectional forming mold with said channel opening accessible to an exterior of said sectional forming mold;
   (d) heating said coupled sheet body to a superplastic forming temperature;
   (e) applying fluid pressure through said channel opening to deform said superplastic sheet bodies into a formed body;
   (f) integrating at least one balancing weight within the head during said step of deforming; and
   (g) removing said formed body from said forming mold and trimming said formed body to conform to a shape of the head, wherein said superplastic sheet bodies are of a material selected from a group consisting of stainless steels, aluminum alloys, magnesium alloys, titanium alloys containing aluminum additions, and zinc alloys containing aluminum additions.

3. A process of making a gold club head according to claim 2, wherein said balancing weight is formed of a superplastic material.

4. A process of making a gold club head comprising the steps of:
   (a) preparing a sectional forming mold having a conjugate cavity of said head defined within, a volume of said conjugate cavity being divided unequally between two sections of said sectional forming mold;
   (b) preparing a coupled sheet body from a plurality of superplastic sheet bodies, at least one of said superplastic sheet bodies having a formed channel groove extending from a central area of said at least one body to an edge of said at least one sheet body to form a channel opening;
   (c) placing said coupled sheet body in said sectional forming mold with said channel opening accessible to an exterior of said sectional forming mold;
   (d) heating said coupled sheet body to a superplastic forming temperature;
   (e) applying fluid pressure through said channel opening to deform said superplastic sheet bodies into a formed body;
   (f) producing a thin-walled of the head using a first cavity section of said sectional forming mold;
   (g) producing a thick-walled portion of the head using a second cavity section having a volume smaller than that of said first cavity section; and
   (h) removing said formed body from said forming mold and trimming said formed body to conform a shape of the head, wherein said superplastic sheet bodies are of a material selected from a group consisting of stainless steels, aluminum alloys, magnesium alloys, titanium alloys containing aluminium additions, and zinc alloys containing aluminum additions.

5. The process of making a gold club head comprising the steps of:
   (a) preparing a section forming mold having a conjugate cavity of said head defined within, a volume of said conjugate cavity being divided unequally between two sections of said sectional forming mold;
   (b) preparing a coupled sheet body from a plurality of superplastic sheet bodies, at least one of said superplastic sheet bodies having a formed channel groove extending from a central area of said at least one body to an edge of said at least one sheet body to form a channel opening;
   (c) placing said coupled sheet body in said sectional forming mold with said channel opening accessible to an exterior of said sectional forming mold;

(d) heating said coupled sheet body to a superplastic forming temperature;
(e) applying fluid pressure through said channel opening to deform said superplastic sheet bodies into a formed body;
(f) producing a thin-walled crown portion of the head within a larger of said two cavity sections; and
(g) removing said formed body from said forming mold and trimming said formed body to conform a shape of the head, wherein said superplastic sheet bodies are of a material selected from a group consisting of stainless steels, aluminum alloys, magnesium alloys, titanium alloys containing aluminium additions, and zinc alloys containing aluminum additions.

* * * * *